(No Model.)

J. C. GARROOD.
SLIDING SEAT FOR BOATS.

No. 294,029. Patented Feb. 26, 1884.

WITNESSES
Joseph Ishbaugh.
B. W. Williams

INVENTOR
John C. Garrood.
By his Atty.
Henry W. Witham

UNITED STATES PATENT OFFICE.

JOHN C. GARROOD, OF BOSTON, MASSACHUSETTS.

SLIDING SEAT FOR BOATS.

SPECIFICATION forming part of Letters Patent No. 294,029, dated February 26, 1884.

Application filed December 24, 1883. (No model.)

*To all whom it may concern:*

Be it known that I, JOHN C. GARROOD, a subject of the Queen of Great Britain, residing in the county of Suffolk and State of Massachusetts, have invented new and useful Improvements in Sliding Seats for Boats, of which the following is a specification.

My invention relates to a series of traveling carriages or boxes provided with ball-bearings, such carriages supporting the seat, and constructed as below set forth, for the purpose of enabling the seat to slide back and forth, while the occupant is in the act of rowing, with as little friction as possible.

Figure 1:
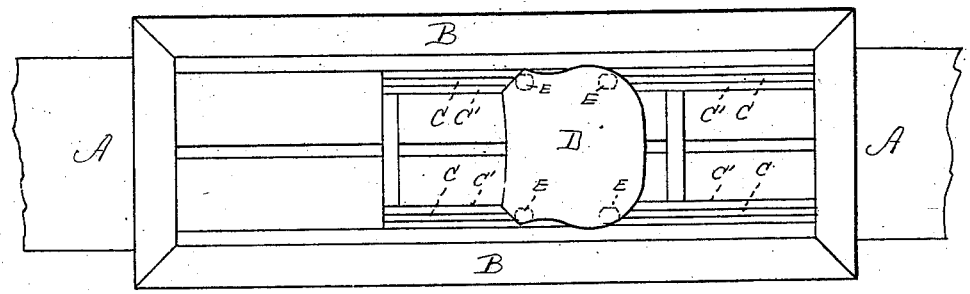
Figure 2:
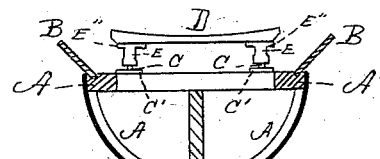
Figures 3, 4:
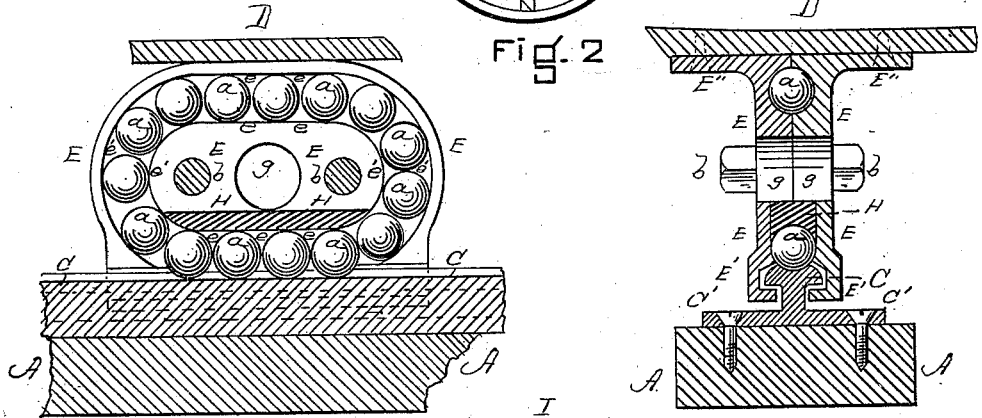

In the accompanying drawings, in which similar letters of reference indicate like parts, Figure 1 is a plan view of a portion of a shell-boat provided with my improvement. Fig. 2 is a transverse vertical section of the same. Fig. 3 is an enlarged vertical longitudinal section of my improved carriage or box. Fig. 4 is a transverse vertical section of the same.

A represents the gunwale and body of the boat; B, the guards; C, two tracks, preferably metallic, running lengthwise with the boat, and secured thereto by bolts or screws passing through their flanges C'; D, the seat, and E the boxes or carriages supporting the seat. Each of the boxes E is of greater length than depth, is flat at top and bottom, and is provided with an internal passage, e e', substantially filled with balls a, adapted to freely move therein, such passage e e' following the general configuration of the box—i. e., being straight, horizontal, and parallel at its parts e, and curved at its parts e'. It is this shape which adapts the ball-bearing for use in connection with the sliding seat of a boat, and distinguishes it from a bicycle ball-bearing. For example, the box E is split centrally, longitudinally, and vertically into two halves, and, when made in castings, is preferably provided with a hard-metal lining, H, next above the lower portion of the passage e e'. The balls rest on the track, as shown in Fig. 4, and guides E' are built, as shown in said figure, to prevent the balls from leaving the track.

b b are bolts for securing the two parts of the boxes E together, and g are openings made to save weight.

Figures 5, 6:
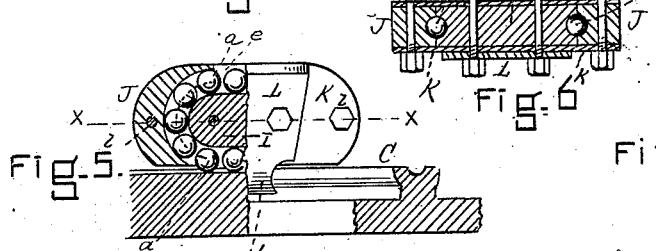
Figure 7:
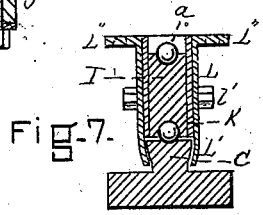

Fig. 5 is a part longitudinal section, and part side elevation, of a modification. Fig. 6 is a horizontal section of the same on line x, Fig. 5. Fig. 7 is a transverse vertical section of the same. In this modification the ball-channel is of exactly the same shape as in Fig. 3, but is produced by a slightly different construction. A central block, I, is grooved for the balls externally. Curved correspondingly-grooved end blocks, J, are placed at the opposite ends, and side plates, K, are bolted on at l. Outer plates, L, provided with extension-guides L', are then bolted on at l', as shown.

The seat is secured to the boxes by means of bolts or screws through the flanges E'' in the original device, and flanges L'' in the modification.

The carriage and bearing above described may be used in any horizontal motion, even though it may not be a straight one.

Having thus fully described my invention, what I claim, and desire to secure by Letters Patent, is—

1. The combination, with a sliding seat and a track in a boat, of a box or carriage secured to said seat, provided with the internal passage, e e', the parts e thereof being substantially straight and parallel, and the parts e' being curved and connecting the parts e at opposite ends, said passage being provided with balls a, adapted to run on said track, substantially as and for the purpose set forth.

2. The ball-bearing for a sliding boat-seat, of substantially the shape shown—i. e., flattened at its upper and under sides—and having the passage e e', provided with the hard-metal lining H, placed next the upper side of the under of the portions e of said passage, substantially as and for the purpose described.

3. The herein-described improved box or carriage E, made in two parts by dividing it vertically and longitudinally, provided with the seat-flanges E'', the passage e e', balls a, and the guides E', all constructed and arranged substantially as and for the purpose hereinbefore set forth.

JOHN C. GARROOD.

Witnesses:
HENRY W. WILLIAMS,
JOSEPH ISHBAUGH.